Figure 4:
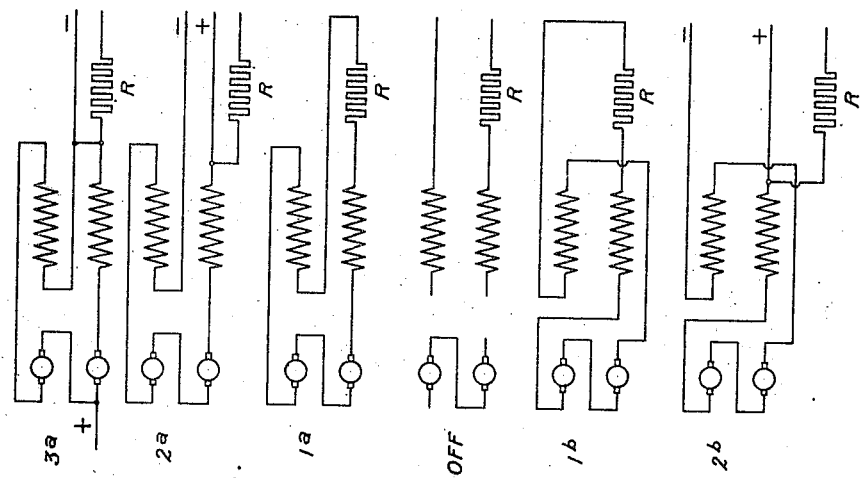

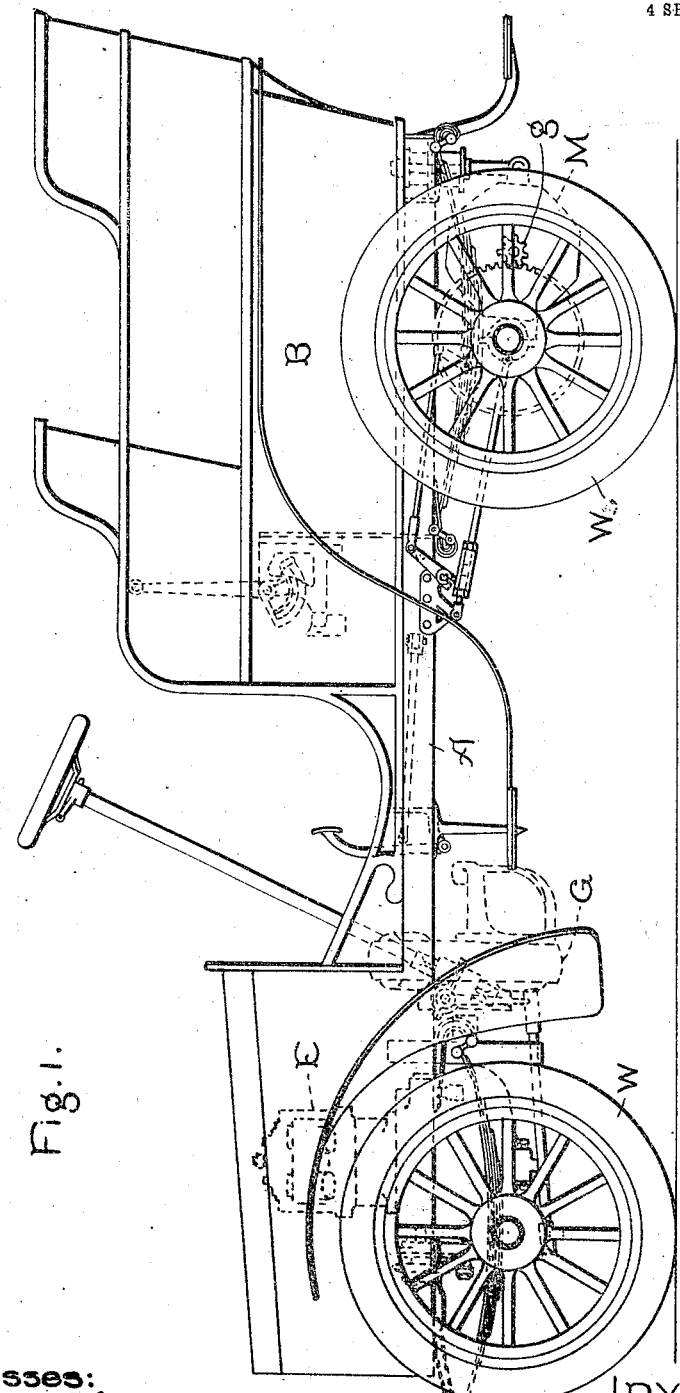

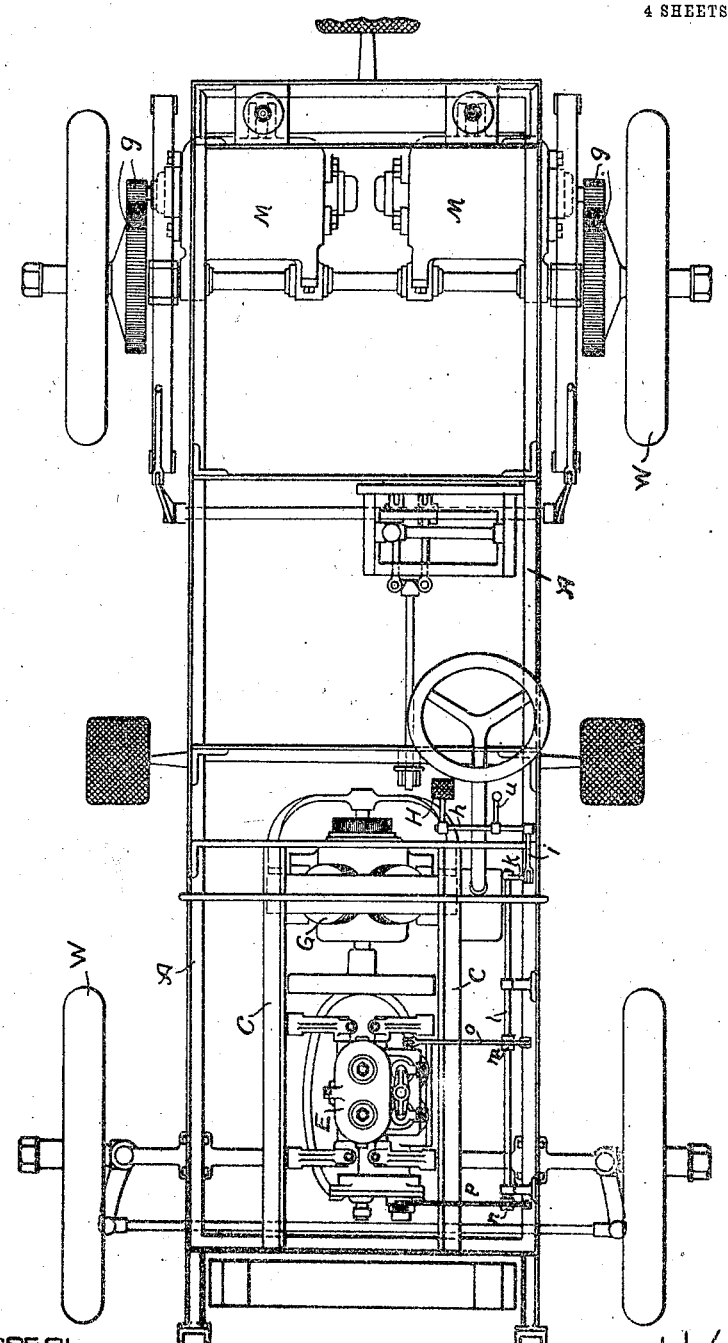

No. 825,225. PATENTED JULY 3, 1906.
H. LEMP.
SELF PROPELLED VEHICLE.
APPLICATION FILED JAN. 14, 1904.

4 SHEETS—SHEET 3.

Witnesses:
L. A. Hawksine
Edward Williams, Jr.

Inventor:
Hermann Lemp.
by Albert G. Davis
Att'y.

No. 825,225. PATENTED JULY 3, 1906.
H. LEMP.
SELF PROPELLED VEHICLE.
APPLICATION FILED JAN. 14, 1904.
4 SHEETS—SHEET 4.
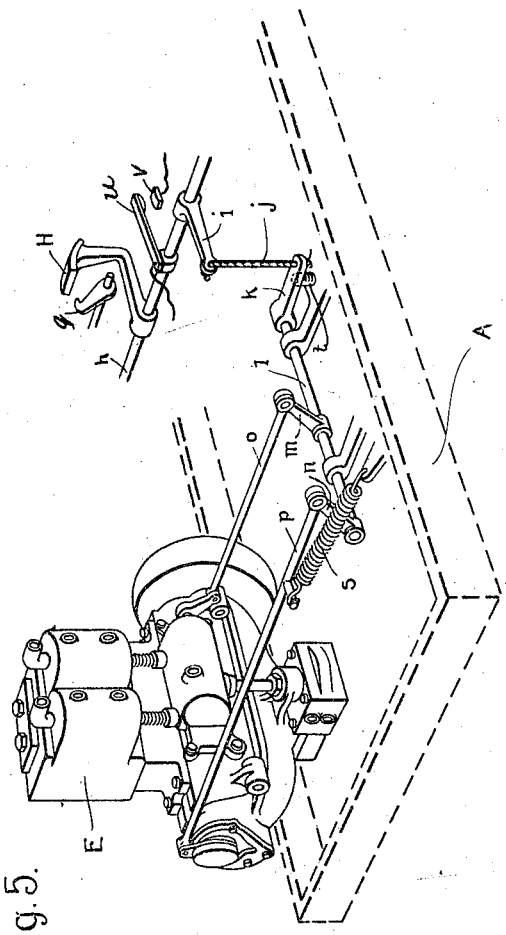
Witnesses.
Robt C. B. Lapman
J. Ellis Glen
Inventor.
Hermann Lemp.
By Albert G. Davis
Atty.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

SELF-PROPELLED VEHICLE.

No. 825,225.   Specification of Letters Patent.   Patented July 3, 1906.

Application filed January 14, 1904. Serial No. 188,958.

*To all whom it may concern:*

Be it known that I, HERMANN LEMP, a citizen of the United States, residing at Lynn, county of Essex, State of Massachusetts, have invented certain new and useful Improvements in Self-Propelled Vehicles, of which the following is a specification.

My invention relates to self-propelled vehicles, and has especial reference to that class of vehicle which derives its motive power from an electric generator driven by a prime mover—such, for instance, as an internal-combustion engine.

When the speed of the vehicle is controlled by varying the speed of the prime mover over wide ranges, thereby varying the voltage of the generator and the power delivered to the motors, I have found that a compound-wound generator gives very good results, since it is not so likely to lose its field magnetism at low speeds as is a shunt-wound machine; but if a compound-wound machine is employed it may happen that on heavy grades or on bad roads so much current is required to drive the motors that the series field of the generator becomes too strong and pulls the engine speed down below economical limits of operation, so that the engine is unable to deliver its maximum output. This is particularly likely to happen when an internal-combustion engine is employed for the prime mover, since the available output of such engines falls off rapidly with decreasing speed. In such a case if the series excitation of the generator is weakened or cut out the engine speed is increased for a given generator voltage and may be brought back within economical limits of operation, so that the maximum output of the engine is delivered to the generator.

My invention consists in the method of increasing the output of a generating unit comprising an internal-combustion engine and a compound-wound generator which consists in decreasing or cutting out the series excitation of the generator on maximum loads.

My invention also consists in the combination in a self-propelled vehicle of prime mover, compound-wound generator, driving motor or motors, and means for weakening or cutting out the series excitation of the generator on heavy loads.

My invention further consists in combining the switch for cutting out the series field of the generator with the pedal or lever for controlling the engine speed, whereby the control of the vehicle is simplified and the number of parts requiring attention from the operator is reduced.

Other features of my invention will be evident from the following specification and accompanying drawings, in which—

Figure 3:
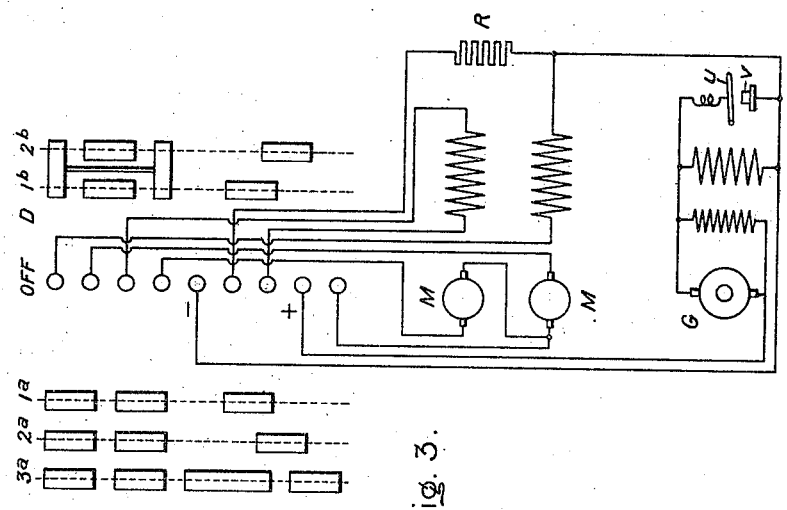

Figure 1 shows a side elevation of an automobile arranged in accordance with my invention. Fig. 2 shows a plan view of the same with the vehicle-body removed to show the frame and motive parts. Fig. 3 shows a controller with its contacts developed in a plane surface, together with the circuits therefor, arranged for the control of a compound-wound generator and two series motors. Fig. 4 shows a set of diagrams illustrating the circuit connections of the motors corresponding to the several positions of the controlling-switch. Fig. 5 shows a perspective view of one of the means for controlling the prime mover and for varying the excitation of the generator.

Referring first to Figs. 1 and 2, A represents the frame of the machine, upon which is mounted the car-body B, to which are secured in the usual manner the bearings for the wheels W. Also secured to frame A is the auxiliary frame C, upon which are supported the prime mover or engine E and the generator G, the armature of which is mounted upon the shaft of engine E. M M represent two electric motors which are mounted on the rear axle in the ordinary manner and each of which drives one of the rear wheels W through the gear $g$.

Referring now to Figs. 3 and 4, D represents the controlling-switch for the electric circuits, comprising nine stationary contact-fingers and the movable contacts, as shown. The controller is arranged for three positions, (indicated by $1^a$, $2^a$, and $3^a$ and $1^b$ and $2^b$, respectively.) The positions $2^a$ and $3^a$ represent the running positions of the controller. When the controller is in the position $2^a$, the generator G is connected to the two motors M M in series, as indicated by diagram $2^a$ of Fig. 4. This position corresponds to the ordinary slow-speed series position of controllers for similar circuits. When the switch D is in position $3^a$, the motors are connected in parallel, this position corresponding to the ordinary high-speed position of such controllers. If the carriage is running with the controller on position 2ª or 3ª and it is desired to brake the carriage, the controller is thrown to the position 1ᵇ, which corresponds to diagram 1ᵇ of Fig. 4, in which the motors are shown short-circuited through a resistance R, thereby obtaining a braking effect, as is well understood in the art. Position 2ᵇ of the controller is the backward-running position in which the generator is connected to the motors M M in series, as in position 2ª, but with the armatures reversed. When the carriage is running backward, with the controller on the position 2ᵇ, and it is desired to brake, the controller may be moved to position 1ª, which corresponds to the braking connections for backward rotation, as shown in diagram 1ª of Fig. 4.

By means of the controlling-switch and arrangement of circuits heretofore described the flexibility of electrical control is utilized in the ordinary manner; but when this control alone is used constant manipulation of the controlling-switch is necessitated, requiring skill and constant attention on the part of the operator. Furthermore, the acceleration in passing from one speed to another is not uniform unless further arrangements of circuit connections are employed, necessitating further complication of the controlling-switch and more or less waste of power in resistances. On the other hand, if the control is obtained by varying the engine speed uniform acceleration of the vehicle may be secured and wear and tear on the engine reduced, since the engine is operated at a speed adapted to the power required and not constantly at full speed.

Referring to Fig. 5, H represents a foot-pedal mounted upon the shaft $h$, which carries the lever $i$. Lever $i$ is connected to lever $k$ on shaft $l$, which runs lengthwise of the carriage, by the flexible connection $j$. Thus when the pedal H is depressed the lever $k$ is raised, rotating shaft $l$ in its bearings. The flexible connection $j$ is used between levers $i$ and $k$, since the motion of these levers is not in the same line, but at right angles. Carried by shaft $l$ are two levers $m$ $n$. The first of these carries a rod $o$, which is connected to the exhaust-valves of the engine in such a manner that the longitudinal motion of rod $o$ varies the lift of the exhaust-valves in a manner well understood in the art. By the variation of the lift of the exhaust-valves the mixture of the engine is regulated and the speed and torque of the engine varied. Lever $n$ is secured to the rod $p$, which operates the ignition device of the engine in such manner that as rod $p$ is moved longitudinally the spark will be advanced or retarded in the well-known manner and further speed control of the engine thereby secured. Rods $o$ $p$ are given sufficient range of movement to vary the engine speed over a wide range. $s$ is a spring attached to rod $p$ and to the frame of the machine and tending to retract rod $p$, rotating shaft $l$, depressing lever $k$, rotating shaft $h$, and lifting pedal H. $t$ is an adjustable stop by means of which the motion of the link mechanism under the influence of spring $s$ is limited. The stop $t$ is so adjusted that when the lever $k$ is pressed against the stop by the spring $s$ and the rest of the link mechanism is in its corresponding position, as shown in the drawings, the position of the spark advance controlled by rod $p$ and the lift of the exhaust-valves controlled by rod $o$ are such that the engine will revolve at a speed too low to permit the generator G to excite to any extent regardless of the position of the controlling-switch. Now if the pedal H is slightly depressed, rotating shafts $h$ and $l$ and moving rods $o$ and $p$ forward, the spark of the engine will be advanced and the lift of the exhaust-valves increased, thereby increasing the speed of the engine. As the engine speeds up above the critical speed of the generator G the generator will pick up and will supply sufficient current to the motors M M for starting the machine. As the pedal H is further depressed the engine speed is further increased and the energy supplied to the motors is also increased. Thus by varying the pressure upon the pedal H the speed of the engine may be controlled over its entire range from a speed below the critical speed of the generator up to the maximum speed of the engine. The vehicle may be brought to rest by simply removing the pressure from pedal H, when the link mechanism will be withdrawn by spring $s$, the spark will be automatically retarded, and the lift of the exhaust-valves decreased, slowing down the engine below the critical speed of the generator. Little or no current is then furnished by the generator and the vehicle comes to rest. This action takes place regardless of the position of the controlling-switch, so that for the control of the vehicle throughout its entire range of speed no manipulation is required of the controlling-switch, which may be moved at the start to the parallel position and left there throughout future starts and stops and the ordinary running of the car.

Although I have shown and described a particular arrangement for controlling the speed of the engine, consisting of means for simultaneously advancing the spark and increasing the lift of the exhaust-valves, it will be understood that this particular arrangement is in no way essential to my invention. If preferred, the admission to the engine may be throttled by means of the link mechanism shown. Further, it is not essential that the regulation of the mixture and the advance of the spark should take place simultaneously;

but instead one may precede the other, or the position of the spark may be controlled automatically by a speed-governor.

In the case of an internal-combustion engine driving a compound-wound generator it sometimes occurs that at maximum load, such as on a heavy grade, a compound winding of the generator produces too great a drag upon the engine, slowing it down below its most economical speed, and thereby reducing the output. I have discovered that this action may be avoided and the maximum output of the generating unit increased by cutting out a part or the whole of the series winding of the generator at maximum loads. In Fig. 5, $u$ represents a switch member carried by the shaft $h$ and so disposed that when the foot-pedal H is fully depressed for the maximum output of the engine and generator the switch member $u$ is brought into contact with the contact-stud $v$, closing the circuit around the whole or a part of the series winding of the generator, as indicated in Fig. 3. Thus at maximum loads the generator is run as a pure shunt-machine, a more favorable speed of the prime mover is obtained, and the maximum output of the generating unit is increased. In order to further increase the speed and output of the prime mover, if necessary, on the steepest grades, the controlling-switch D may be moved to the series position; but for ordinary grades no manipulation of the controlling-switch is necessary.

In Fig. 5 I have shown the pivoted catch $q$, which is adapted to engage pedal H and hold it in a slightly-depressed position while the engine is first started by hand. After the engine is once started the pedal H is further depressed to raise the engine speed above the critical speed of the generator, and catch $q$ is released and falls back into an inoperative position. It does not come again into use during the operation of the machine, since the vehicle is stopped and started without stopping the engine.

While for the purpose of more clearly illustrating my invention I have shown and described a complete automobile, it will be understood that many of the parts shown and described are not essential to my invention and may be greatly varied without departing from the spirit of my invention.

Accordingly I do not desire to limit myself to the particular construction and arrangement of parts here shown, since changes which do not depart from the spirit of my invention and which are within the scope of the appended claims will be obvious to those skilled in the art.

What I claim as new, and desire to secure by Letters Patent of the United States, is—

1. The method of increasing the maximum output of a generating unit comprising a prime mover and a compound-wound electric generator driven thereby, which consists in cutting out the series field of the generator at maximum load.

2. The method of increasing the maximum output of a generating unit comprising an internal-combustion engine and a compound-wound electric generator driven thereby, which consists in operating the generator as a shunt-machine at maximum loads.

3. The method of controlling a self-propelled vehicle deriving its motive power from a compound-wound electric generator driven by a prime mover, which consists in starting the prime mover with the generator operating with a compound winding and in running the generator under load as a shunt-machine.

4. The method of controlling a self-propelled vehicle deriving its motive power from a compound-wound electric generator driven by a prime mover, which consists in starting the generator under load operating with a compound winding and then decreasing the series excitation of the generator.

5. The method of controlling a self-propelled vehicle deriving its motive power from a compound-wound electric generator driven by a prime mover, which consists in starting the prime mover with the generator connected as a compound machine to the work-circuit and in running the generator under full load as a shunt-machine.

6. In a self-propelled vehicle, a prime mover, a compound-wound electric generator driven thereby, an electric motor driven by said generator, and means for cutting out the series field of said generator at full load.

7. In a self-propelled vehicle, a prime mover, an electric generator driven thereby, an electric motor driven by said generator, means for starting said generator as a compound-wound machine, and means for decreasing the series excitation when the generator is running under load.

8. In a self-propelled vehicle, a prime mover, an electric generator driven thereby, an electric motor driven by said generator, means for starting said prime mover with said generator connected to said motor, and means for cutting out the series field of said generator under load.

9. In a self-propelled vehicle, a prime mover, an electric generator driven thereby, an electric motor driven by said generator, means for starting said generator as a compound machine, and means for running said generator as a shunt-machine.

10. In a self-propelled vehicle, a prime mover, a compound-wound generator driven thereby, an electric motor driven by said generator, a lever, means controlled thereby for varying the speed and output of said prime mover over a wide range, and a switch operated by said lever to cut out the series field of said generator at full load.

11. In a self-propelled vehicle, an internal-combustion engine, an electric generator driven thereby, an electric motor driven by said generator, a lever, means controlled by said lever for regulating the mixture of said engine, means controlled by said lever for advancing the spark of said engine, and a switch operated by said lever to cut out the series field of said generator at full load.

12. In a self-propelled vehicle, an internal-combustion engine, an electric generator driven thereby, an electric motor driven by said generator, a lever, means controlled by said lever for increasing the lift of the exhaust-valves of the engine, means controlled by said lever for advancing the spark of the engine, and a switch operated by said lever for cutting out the series field of said generator at full load.

13. In a self-propelled vehicle, an internal-combustion engine, a compound-wound electric generator driven thereby, an electric motor driven by said generator, means for advancing the spark of said engine, means for regulating the mixture of said engine, a switch for cutting out the series field of the generator, and a single lever controlling by its movement said spark-advancing means, said mixture-regulating means and said switch.

In witness whereof I have hereunto set my hand this 12th day of January, 1904.

HERMANN LEMP.

Witnesses:
L. A. HAWKINS,
EDWARD WILLIAMS, Jr.